United States Patent
Selvaraj et al.

(10) Patent No.: US 7,440,944 B2
(45) Date of Patent: Oct. 21, 2008

(54) METHOD AND APPARATUS FOR EFFICIENT TRAINING OF SUPPORT VECTOR MACHINES

(75) Inventors: Sathiya Keerthi Selvaraj, South Pasadena, CA (US); Dennis M. DeCoste, La Canada, CA (US)

(73) Assignee: Overture Services, Inc., Pasadena, CA (US)

( * ) Notice: Subject to any disclaimer, the term of this patent is extended or adjusted under 35 U.S.C. 154(b) by 363 days.

(21) Appl. No.: 10/949,821

(22) Filed: Sep. 24, 2004

(65) Prior Publication Data

US 2006/0074908 A1    Apr. 6, 2006

(51) Int. Cl.
*G06F 7/00* (2006.01)
(52) U.S. Cl. ............ 707/6; 707/1; 707/7; 707/10
(58) Field of Classification Search .......... 707/3, 707/104.1, 100, 5, 6, 7, 1, 10
See application file for complete search history.

(56) References Cited

U.S. PATENT DOCUMENTS

| | | | |
|---|---|---|---|
| 5,687,364 A * | 11/1997 | Saund et al. | 704/5 |
| 6,192,360 B1 * | 2/2001 | Dumais et al. | 707/6 |
| 2003/0028541 A1 * | 2/2003 | Bradley et al. | 707/100 |
| 2003/0167267 A1 * | 9/2003 | Kawatani | 707/6 |

* cited by examiner

*Primary Examiner*—Hosain T Alam
*Assistant Examiner*—Leon J Harper
(74) *Attorney, Agent, or Firm*—Seth H. Ostrow; Dreier LLP

(57) ABSTRACT

The present invention provides a system and method for building fast and efficient support vector classifiers for large data classification problems which is useful for classifying pages from the World Wide Web and other problems with sparse matrices and large numbers of documents. The method takes advantage of the least squares nature of such problems, employs exact line search in its iterative process and makes use of a conjugate gradient method appropriate to the problem. In one embodiment a support vector classifier useful for classifying a plurality of documents, including textual documents, is built by selecting a plurality of training documents, each training document having suitable numeric attributes which are associated with a training document vector, then initializing a classifier weight vector and a classifier intercept for a classifier boundary, the classifier boundary separating at least two document classes, then determining which training document vectors are suitable support vectors, and then re-computing the classifier weight vector and the classifier intercept for the classifier boundary using the suitable support vectors together with an iteratively reindexed least squares method and a conjugate gradient method with a stopping criterion.

11 Claims, 7 Drawing Sheets

400

| | DOCUMENT #1 | | DOCUMENT #2 | |
|---|---|---|---|---|
| WORD | NUMBER OF TIMES IN DOCUMENT | WORD | NUMBER OF TIMES IN DOCUMENT | |
| linear | 1 | linear | 0 |
| method | 0 | method | 0 |
| primal | 0 | primal | 0 |
| square | 0 | square | 0 |
| dual | 3 | dual | 0 |
| iterate | 1 | iterate | 2 |
| cost | 0 | cost | 1 |
| ⋮ | ⋮ | ⋮ | ⋮ |
| matrix | 0 | matrix | 0 |
| empirical | 0 | emperical | 0 |
| sequence | 0 | sequence | 0 |
| stop | 0 | stop | 0 |
| function | 1 | function | 1 |
| solutions | 0 | solutions | 0 |
| ⋮ | ⋮ | ⋮ | ⋮ |

Fig. 4

METHOD AND APPARATUS FOR EFFICIENT TRAINING OF SUPPORT VECTOR MACHINES

BACKGROUND OF THE INVENTION

The present invention relates to classifying data. More particularly, the present invention relates to methods and apparatus for classifying documents, including textual documents, using Support Vector Machine (SVM) classifiers.

A discussion of the need for data classification and some earlier approaches to it, including rule-based systems, Bayesian networks and Neural Networks, can be found in Dumais, et al., U.S. Pat. No. 6,192,360.

The increasing use of statistical methods in the sciences in recent decades spurred the search for improved statistical approaches to classifying large amounts of data. Some wanted to read handwritten documents, which meant that they needed to classify a great many samples of handwritten words. Others wanted to separate photographed faces from their background. Medical researchers wanted to separate lab characteristics of benign and malignant tumors. The rise and spread of the World Wide Web in the 1990s greatly increased the dissatisfaction with existing statistical methods for searching and classifying large amounts of text. Beginning in the early 1990s, Vladimir Vapnik and others devised a new statistical approach to large classification problems. This method is referred to as a Support Vector Machine (SVM), a mathematical technique with which it is possible to teach a computer to classify large amounts of data more reliably than ever before. Mathematicians and scientists continue to search for ways to improve these new learning machines.

SVMs are powerful tools for solving large-scale classification problems such as those sometimes seen when classifying text. But, quite commonly, it is characteristic of many text classification problems that while they involve a large number of pages and a large number of words, any given page naturally contains only a tiny percentage of the words found in the English language, and a very small percentage of those seen in the entire group of pages. That is to say that if we look in a single document among a great many documents in a related set of documents for all of the words found throughout the entire set, we will find far more words missing from the document than are found in the document. This is referred to as a sparse data matrix. Such classification problems as these, problems with a huge number of documents and a large number of words and a sparse data matrix, require a classification engine that can achieve fast processing performance.

For many such problems, however, an amount of computer memory ordinarily not available is needed for SVM handling of the data presented by text-intensive problems such as those often found in categorizing large numbers of text pages found on the Web. One solution which has improved the ability of computers to learn to classify such data was 'chunking', in which the problem was broken up into smaller, more manageable pieces that are within the processing capability of commonly available computer resources. Among such chunking decomposition techniques used to reduce such problems for SVMs are classifier techniques known as SMO and SVM Light. However, the speed improvement made possible with these techniques often is modest, especially for designing classifiers—such as those needed for web pages—where some of the largest and most difficult text problems are to be found. As a consequence, it is desirable to build a faster classifier engine for Web pages, and other large text problems. And, of course, classification problems other than text, but of similar size and similar data characteristics, also benefit from increased machine learning speed.

Speed is very desirable, but existing techniques, including the decomposition techniques referred to as SVM Light and SMO do not facilitate fast learning for classifiers of the large numbers of documents found in many classification problems. Hence there is a need for an SVM classifier design with accuracy that matches that of existing classifier engines but is significantly faster is needed to reduce the training time of Support Vector Machines.

SUMMARY OF THE INVENTION

In accordance with the present invention the learning speed of a support vector machine classifier when applied to large classification problems including those found in data mining text is greatly increased, where the number of documents is large (perhaps millions) and the number of words in the collection of documents is large as well (tens of thousands to millions), and where normally very few of the words found in the entire collection are found in a given document. The approach employed in preparing the training documents for the learning process is no different than that used for other Support Vector Machines (SVMs); and neither are the solutions for a given classifier or the classifier accuracy. The difference is found in using a linear approach to the SVM design which makes it possible to make good use of iteratively reindexed least squares (IRLS) and least squares conjugate gradient methods. This results in much greater speed for many large text problems. In one embodiment, a support vector classifier useful for classifying a plurality of documents, including textual documents, is built by selecting a plurality of training documents, each training document having suitable numeric attributes which are associated with a training document vector, then initializing a classifier weight vector and a classifier intercept for a classifier boundary, the classifier boundary separating at least two document classes, then determining which training document vectors are suitable support vectors, and then re-computing the classifier weight vector and the classifier intercept for the classifier boundary using the suitable support vectors together with an iteratively reindexed least squares method and a conjugate gradient method with a stopping criterion.

BRIEF DESCRIPTION OF THE DRAWINGS

FIG. 4 shows a table of words, word frequencies, and values in a sparse data matrix training document.

DETAILED DESCRIPTION OF THE INVENTION

Figure 1:
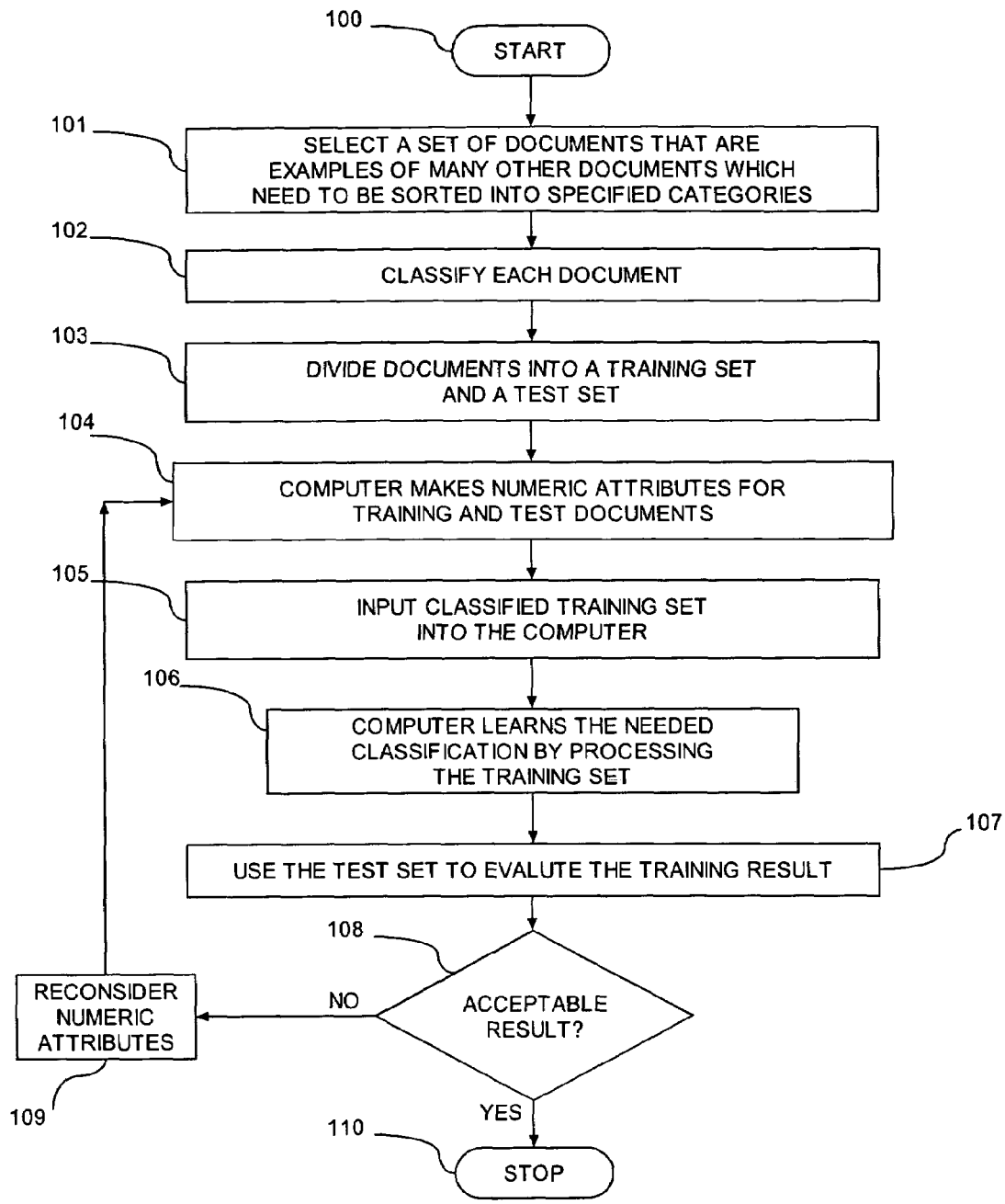
FIG. 1 is logic flow diagram showing a support vector machine learning process in accordance with the present invention.

The present invention will now be described in detail with reference to a few preferred embodiments thereof as illustrated in the accompanying drawings. In the following description, numerous specific details are set forth in order to provide a thorough understanding of the present invention. It will be apparent to one skilled in the art, that the present invention may be practiced without some or all of these specific details. In other instances, well-known process steps have not been described in detail in order to not unnecessarily obscure the present invention. The features and advantages of the present invention may be better understood with reference to the discussion that follows and to the drawings. FIG. 1 provides an overview of the process flow of the embodiment.

FIG. 1 is logic flow diagram showing a support vector machine learning process. This embodiment makes it possible to design an SVM (Support Vector Machine) classifier for many text classification problems which learns class boundaries and margins far more quickly than is accomplished by present techniques. The original optimization problem that corresponds to the SVM design is usually referred to as the primal problem. For non-linear SVMs this problem resides in an abstract space and since, as such, this problem is not directly solvable, the problem is converted into an equivalent, computationally solvable problem called the dual problem. Thus traditional SVM designs are done by solving the dual problem, for example as illustrated by Dumais et al., U.S. Pat. No. 6,192,360. However, for linear SVMs, the primal problem resides directly in the space of the input variables of the classifier and so it is feasible to solve the problem directly. This is the approach taken here. The inventors have discovered that it is unnecessary to consider certain text problems as requiring the same nonlinear mathematical techniques commonly used for data classification problems, and that it is often counterproductive to do so. Text problems as large as categorizing millions of Web page documents can be treated as simple linear classification problems and an appropriate, faster classifier constructed by adapting well-known least squares and conjugate gradient techniques for use with linear $L_2$-SVMs. Such text can include not only Web page documents and non-electronic documents, but documents from email, voicemail, and messages sent via SMS, EMS, MMS which include their storage on media including paper or electronic media such as floppy discs, CDs, DVDs and computer hard discs.

Preparing Text for the Support Vector Machine

Just as with other approaches to SVM learning, beginning with step 101, a group of text objects of appropriate volume are prepared for machine training and testing. Note that neither the size of the group of text objects selected nor their features affect which embodiment of the invention is applied to the data gathered from the text objects. As a training set and a test set of text objects, a user might select in step 101 a group of 10,000 randomly chosen web pages, and have the randomly chosen web pages manually classified in step 102 into two classifications, 'classification one' 201 and 'classification two' 202, by human review based on textual content of each web page (referred to hereafter as a 'document'). In order to learn, the SVM needs to take note of features specific to each document. This could be individual words, groups of words or other letter strings, colors, images, number or style of typefaces, size of type, color of type, use of numbers—or any other web page features or combinations of various features. In short, anything found on the pages that distinguishes one page from another and might be assumed to be helpful in the classification task. A simple, common choice would be to use the individual words as the features in each document, as in FIG. 4 which shows a table of words, word frequencies, and values in a sparse data matrix training document.

Since machine learning requires that the words (features) in each document have numeric attributes usable by the support vector machine, each of the words in each document can be assigned an individual number that is the same on every document on which the word is found throughout the entire training set. For example word 402 also can be given a 'value' number 404 for each document, indicating how many times the word appears in that document (see step 104).

In the table of FIG. 4 is a display showing the frequency of use of some of the words on a particular web page. Only some of the words are shown, along with their frequencies of appearance in the page. The value of 'i' in $x_i$ in the equations used to develop the desired support vector machine classifier goes from 1 to the total number of documents (web pages) in the entire group. The number associated with each word is the vector value contribution made by that web page's data to the weight vector for the entire training sample for the dimension represented by that particular word. Words shown below with 0 value appear as 'value' number 406 in the training sample, but on pages other than this particular page.

So, the features that will be the focus of SVM learning in this embodiment are individual words. Each word (feature) has two numbers associated with it for each document—one number to indicate just what word 402 is, and a number to indicate the number of times the word appears in a particular training document.

The randomly chosen web pages are manually classified and divided into two groups of documents, a training set 301, and a (usually smaller) test set 302. In the computer, a software text analyzer reviews each document and assigns a different number to each word used in the training set, and, for each document, a number indicating how frequently each word occurs in each document. These are the two numbers associated with each word (feature) in each document in the case where words have been selected as the features, and only one attribute of these features (a nonlinear score representing frequency of occurrence) is chosen (in this case) for training the SVM. Where words have been selected as the features, it is often found to be desirable to reduce the number of words in some way that seems calculated to improve machine training. For example, words such as 'the', 'and' 'or' 'is' 'because' can not be expected to help, and might be damaging.

Figure 6:
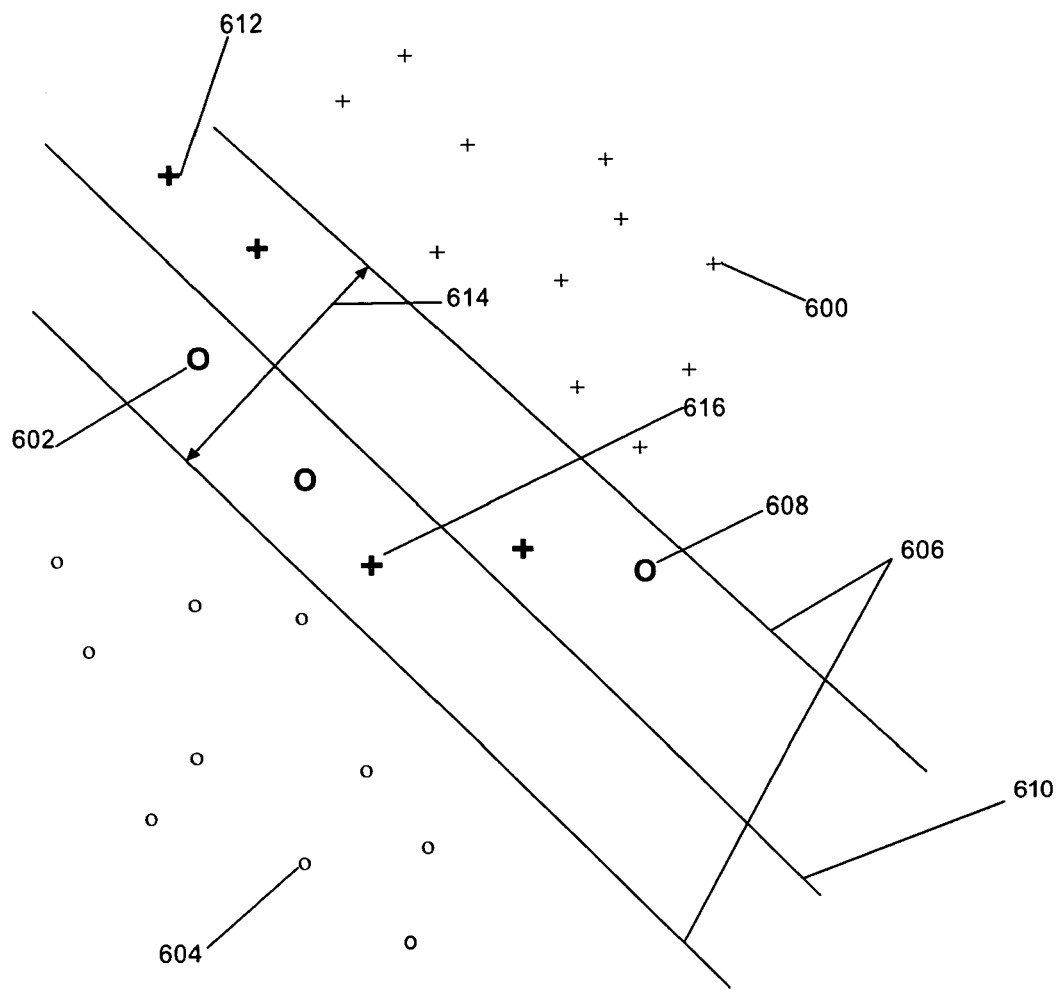
FIG. 6 shows, diagrammatically, a boundary plane, boundary margins, an indication of the relation of boundary margins to the value of the optimal boundary weight vector, and various classified points for a two-category classification of web pages, with bold data points indicating support vectors.
Figure 7:
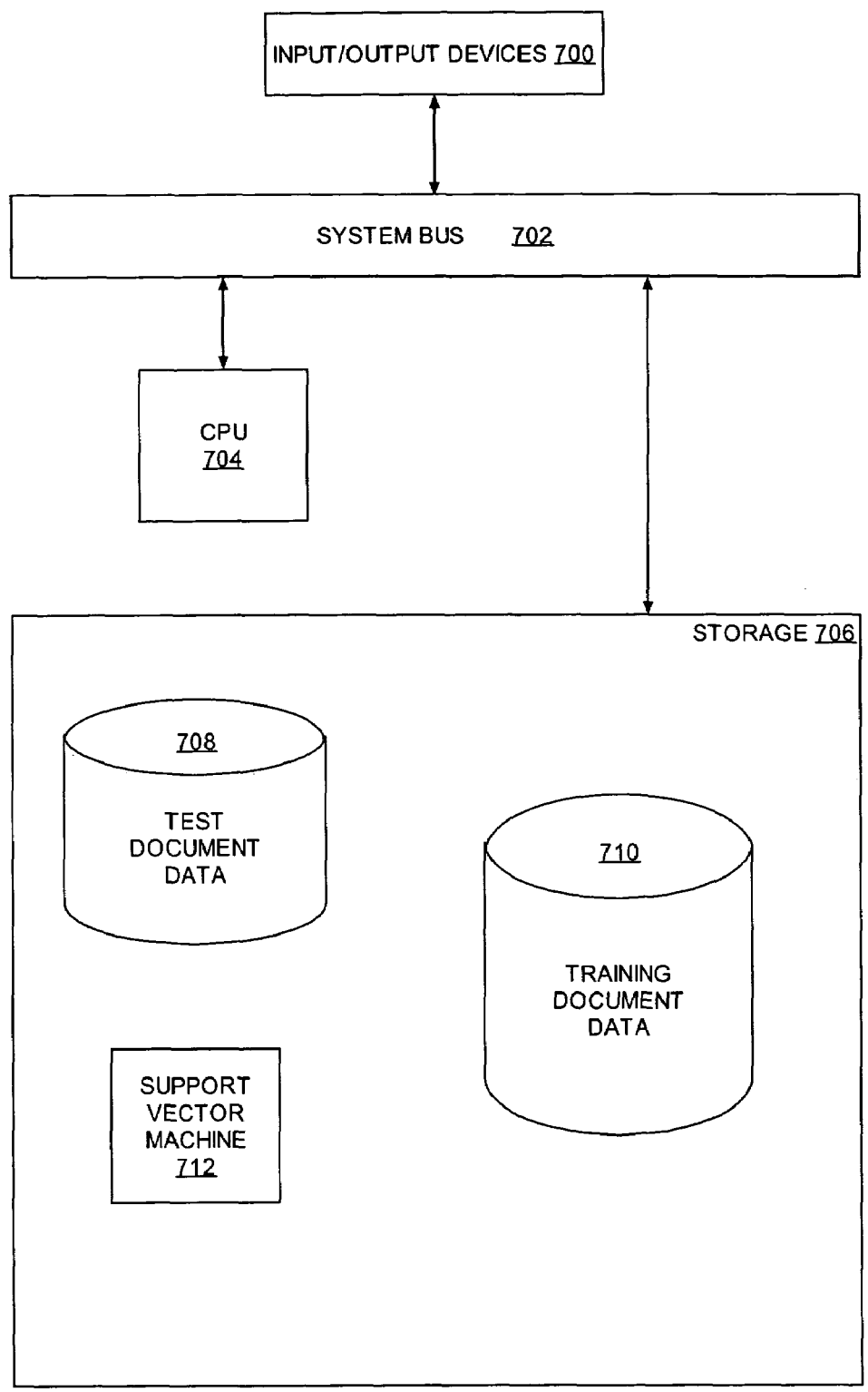
FIG. 7 is a block diagram of a Support Vector Machine executing within a computer in accordance with the present invention.

The training set 301 and test set 302 have been selected in step 103, and it has been decided just what features on these pages might best serve to train the support vector machine and numbers have been assigned to those features and the documents processed with the text analyzer. Now it is time to apply the invention's mathematical techniques so as to determine a boundary between the two classifications of web pages. FIG. 6 shows a graphical display of a boundary plane, boundary margins, an indication of the relation of boundary margins to the value of the optimal boundary weight vector, and feature information which shows a group of data points, each representing a training document. The location of these points is the result of vector expressions of the numeric 'values' assigned by the text analyzer software to each of the document's words (features). These data points are separated by a boundary line 610 indicating one classification of web pages as pluses, such as the data point plus sign 600, mostly on one side of the boundary 610 and the data points on the other side of the classifier's separating boundary 610 mostly as zeros 604.

It is recognized by those skilled in the art of designing support vector machines (SVMs) that the best classifier for such data points also will have margins 606 (a margin on each side of the boundary 610 that separates data points in one classification from those in the other) that are as widely separated as possible ‖2/w‖ arrow 614 on each side of the boundary. The support vector machine declares Class 1 data points (designated in FIG. 6 as non-bold plus signs, including plus sign 600) that lie above the upper margin plane and Class 2 data points (designated in FIG. 6 as non-bold zeros, including non-bold zero 604) that lie below the lower margin plane are correct classifications. All other data points (those shown in bold in FIG. 6) are taken to be in error and are referred to as 'support vectors'. The term 'support' was originally a mechanical analogy to stiffeners supporting a wall, similar to the effect of these vectors on boundary planes. The most widely set appropriate boundaries will avoid 'overfitting'— that is to say that the ability of the trained classifier will not be so narrowly fitted to the training data received as to be compromised in the ability to classify data with which it is tested. Slacks, the term for misclassifications, or violations on the wrong side of their respective margins, are shown bold zero 608 & bold plus sign 616 for both classifications (pluses and minuses).

The purpose of the classifier's learning process is to find a weight vector w and an intercept, b, that best satisfy the equation y=w·x+b which describes the boundary between the two text classes used in this embodiment.

Processing the Training Set

The embodiment allows much faster learning performance for large scale classification problems such as those often found in data-mining text which have large numbers of documents with a huge number of features (such as words) and a data matrix where many features on most documents are given zero as a numeric 'value', i.e. where a given word is not present in a given document. For such problems, the embodiment offers a different approach for optimizing the boundaries of the separating plane and minimizing classification error and the effect of misclassifications. The embodiment does so by rejecting existing mathematical techniques in favor of applying least squares and conjugate gradient methods to linear $L_2$-SVMs.

Data points including bold zero 608 & bold plus sign 616 that appear on the wrong side of their respective margins 610, that is to say misclassified points, are termed 'slacks'. These violations are represented by the Greek letter ξ and are penalized quadratically ($\xi^2/2$) in the equations used in the $L_2$-SVM (Support Vector Machine). The approach taken by this embodiment takes advantage of the fact that, with $L_2$ slacks the primal problem can be formulated as the unconstrained minimization of a continuously differentiable, strictly convex objective function. The approach is a new variation of the iteratively reindexed least squares method (IRLS) and linear least squares conjugate gradient schemes, that are known to those skilled in the art of designing learning machines. Conjugate gradient methods are helpful because of the good use conjugate gradient methods make of sparsity in the data matrix—such as the presence of a great many features with zero value on any given training document. For many classification problems, this new approach provides a clear advantage in SVM learning speed over decomposition methods such as SMO.

Figure 2:
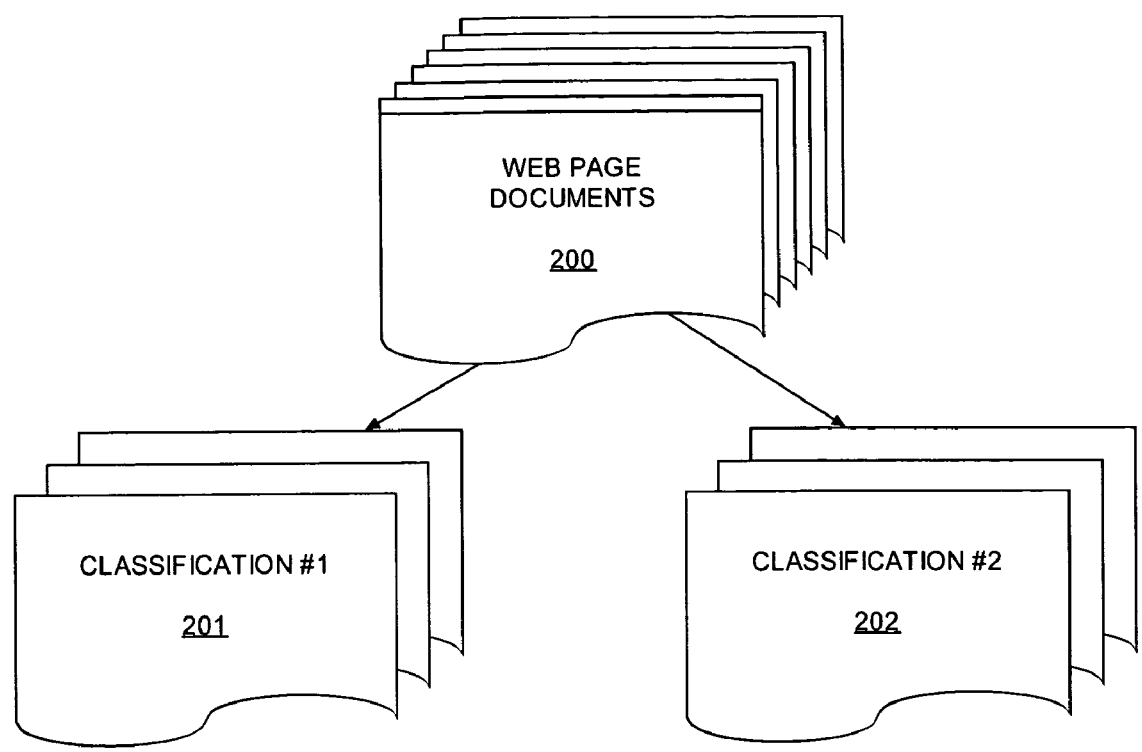
FIG. 2 is a block diagram of pages manually labeled with the proper classifications.
Figure 3:
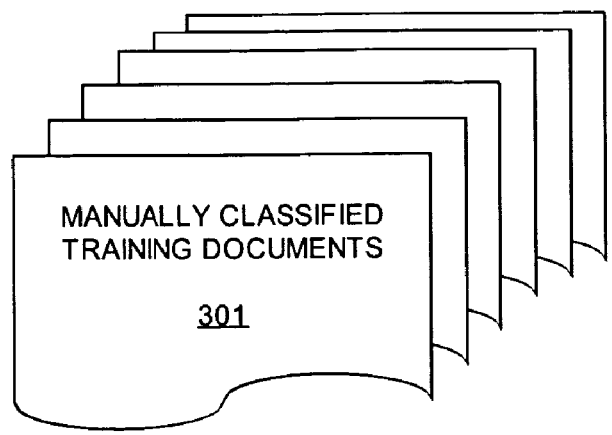
FIG. 3 is block diagram showing a training set of documents and a test set.
Figure 3:
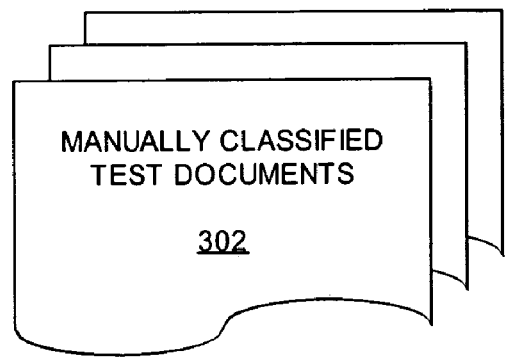
Figure 5:
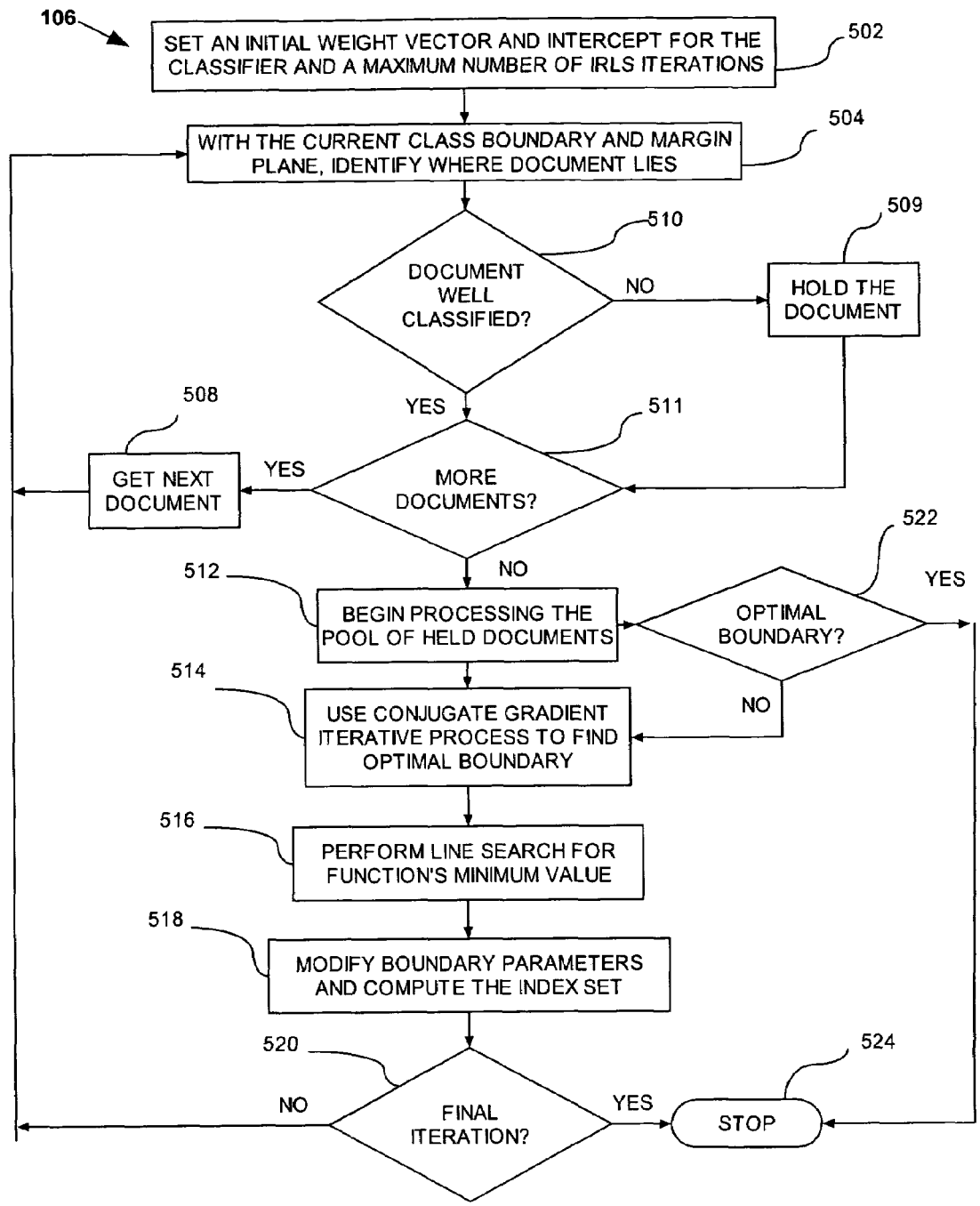
FIG. 5 is a logic flow diagram showing in greater detail the iterative process of the logic flow diagram of FIG. 1.

When using this embodiment to build a classifier for a binary text classification problem (one with two classes, such as the 'classification one' 201 and 'classification two' 202 of FIG. 2) with training documents (examples) $\{x_i, t_i\}$ ((where i is the number of the training examples which number from 1 to m; x represents the word vectors, and t the value of y for the data points)) the goal is to generate a linear classifier of the form y=w·x+b. The distance between the classifier's margins is 2/‖w‖ arrow 614. The embodiment uses a linear $L_2$-SVM-IRLS iterative process to solve the primal problem shown below and therefore to find the minimum w. As is understood by those skilled in the art of SVM (Support Vector Machine) classifier construction, this will produce the optimum classifier for a given problem. The optimum classifier is built by tentatively setting certain initialization parameters in step 502 for an optimizing equation, then performing cycles of a least squares iteration process beginning in step 504, determining whether document data points are Well-Classified points located beyond their respective margins, and therefore are, unlike support vectors including bold zero 602 and bold plus sign 612, to be ignored in step 508. Then, going to step 510, the numeric attributes of the Support Vectors (the data points that are not Well-Classified) of other documents are pooled and processed in step 512 and the result is checked for optimality. If, in step 522, an optimal solution is found, the process stops in step 524. If the optimal solution is not found in step 522, an iterative conjugate gradient process is employed in step 514, which performs an exact line search in step 516 and modifies in step 518 the boundary parameters w and b until an iteration produces the optimal boundary and boundary margins, yielding the best w and b for the training data. When this is determined, the computer will use that w and b, along with each test document's x vector values, to solve for y in the equation y=w·x+b in order to machine classify with confidence randomly selected similar documents.

The development of the optimizing equation is shown below, beginning with:

$$\min_{(w,b)} \tfrac{1}{2}(\|w\|^2+b^2)+C/2\sum_{i=1}^{m}\rho_i\xi_i^2 \quad \text{(equation 1)}$$

such that $t_i(w \cdot x+b) \geq 1-\xi_i$ for all $i$ where $t_i \in \{+1, -1\}$, w is a weight vector parameter, x is the feature vector, b is the threshold parameter, $t_i$ is the known classification of the $i^{th}$ training document, $\rho_i$ is the weight assigned to the $i^{th}$ training document (example), and C is the regularization parameter used to alter the balance between the need for classification accuracy and the need to control the possibility of overfitting the classifier.

To apply least squares ideas neatly, it is convenient to transform the above to an equivalent formulation by eliminating the $\xi_i$'s and dividing the objective function by C, the regularization parameter mentioned above. This gives $$\min_{\beta} f(\beta) = \lambda/2\|\beta\|^2 + 1/2 \sum_{i \in I(\beta)} \rho_i d_i^2(\beta) \quad \text{(equation 2)}$$

where $\beta=(w,b)$, $\lambda=1/C$, $d_i(\beta)=y_i(\beta)-t_i$, $y_i(\beta)=w \cdot x_i+b$, and $I(\beta) = \{i: t_i y_i(\beta) < 1\}$.

Proximal SVM is a simple approach to classifier design by which the classification problem is converted to a least squares regression problem by taking the targets for the two classes to be 1 and −1. The main negative aspect of this approach is obvious: this approach also penalizes examples that are on the well-classified side of the margin planes. Therefore, even though the proximal SVM is a reasonable technique, it does not do as well as the $L_2$-SVM in terms of classification accuracy.

Proximal SVM corresponds to equation 1 above if the inequality constraints are replaced by the equality constraints, $$t_i(w \cdot x + b) = 1 - \xi_i \text{ to for all } i. \quad \text{(equation 3)}$$

When changed to the form of equation 2, it amounts to setting $I(\beta)$ as the entire index set of the training documents, which means that for proximal SVM the solution can be done via a single regularized least squares solution.

$L_2$-SVMs are especially advantageous because, being dependent on $I(\beta)$, $L_2$-SVMs do not allow data from the well-classified training documents to disturb the classifier design, which is of particular importance in problems where the support vectors (those data points from the less well-classified training documents) are only a small fraction of the total number of training documents.

The vector $\bar{\beta}$ minimizes $f$ in equation 2, since there is an open set $\bar{I}$ around $\beta$ in which $f$ and $f_{\bar{I}}$ are identical. This can be seen by first noting that because of the presence of $\lambda/2\|\beta\|^2$ in equation 2, $f$ is a piecewise quadratic function which is strictly convex, and therefore has a unique minimizer. Furthermore, $f$ is continuously differentiable in spite of the jumps in $I(\beta)$, because when an index $i$ causes a jump in $I(\beta)$ at some $\beta$, its $d_i$ is zero. The gradient of $f$ is given by $$\nabla f(\beta) = \lambda \beta + \sum_{i \in I} \rho_i d_i(\beta) \binom{x_i}{1} \quad \text{(equation 4)}$$

Given an index set $I \subset \{1, \ldots, m\}$, the function $f_I$ can be defined as:

$$f_I(\beta) = \lambda/2\|\beta\|^2 + 1/2 \sum_{i \in I} \rho_i d_i^2(\beta) \quad \text{(equation 5)}$$

And $f_I$ is a strictly convex quadratic function and so has a unique minimizer.

Applying the $L_2$-SVM-IRLS and CGLS Iterative Methods

The approach taken in this embodiment is to do a second order approximation of the objective function at the iteration's current point to form a regularized least squares problem and take the solution of that problem as the next point. A slight variation of this idea is applied to the minimization of $f$. Given a point $\beta$, set $I=I(\beta)$ and minimize $f_I$ to obtain the intermediate point $\bar{\beta}$. Then do a line search (exactly) 516 on the ray from $\beta$ to $\bar{\beta}$ which will yield the next point for the IRLS method. Continued iterations of this process 106 are repeated until convergence, which gives the desired w and b. Those tempted to use the finite Newton method for classification problems having a large number of features will quickly see the advantages of the method described here. The finite Newton method misses the least squares nature of these problems when doing the main iteration, uses inexact line search, and without proper conjugate gradient techniques is extremely inefficient.

Complexity, Learning Speed and the Advantage of $L_2$-SVM-IRLS

The $L_2$-SVM-IRLS (Support Vector Machine-Iteratively Reindexed Least Squares) iterative process, including the use of conjugate gradient iterations, has empirical complexity $O(n_{nz} \min\{m,n\})$, where '$n_{nz}$' is the number of non-zero elements in the data used. However, other approaches to the problem show greater complexity, which can become quite a substantial learning speed burden for problems with a large number of features and a small number of training documents. With the decomposition method called SMO, for example, each basic step costs $O(n_{nz})$. A 'step' in the SMO method corresponds to the 'Takestep' call, where two Lagrange multipliers are chosen and optimized and the output cache is updated. And, ordinarily, the number of basic steps is a superlinear function of m, which can be described as $O(m^d)$ where d is an empirical exponent slightly larger than 1. The empirical complexity of the SMO method is then $O(n_{nz} m^d)$. So, when the number of training documents is large, SMO suffers not only because of the ineffectiveness of its fixed kernel cache size, but also because of slower processing due to the large number of takesteps noted above.

The use of this embodiment's $L_2$-SVM-IRLS iterative process described below in detail results in much greater training speed for such problems. The overall iterative process for using $L_2$-SVM-IRLS is given below, with associated implementation details associated with each step. The details given below are also applicable to proximal SVM implementation.

The Iterative Processes for $L_2$-SVM-IRLS and CGLS (Conjugate Gradient Least Squares)

Choose in step 502 a suitable starting $\beta_0$. Set k=0 (where k is the number of the iteration) and go to step 504. If no assumption of $\beta$ is available, then the simplest starting vector is $\beta_0$=0. For this point we have $y_i$=0 for all i and so $I_0$ is the set of all training indices. Therefore, with such a zero initialization, the $\bar{\beta}$ obtained below is the proximal SVM solution.

Suppose, instead, that we set in step 502 a tentative $\tilde{w}$. If $\tilde{w}$ comes from an inexpensive classification method, such as the Naive-Bayes classifier, then we should re-scale $\tilde{w}$ and also choose $b_0$ so as to form a $\beta_0$ that is good for starting the SVM solution process. So we set $\beta_0 = (\gamma \tilde{w}, b_0)$ and choose suitable values for $\gamma$ and $b_0$. Suppose we also assume that I, a tentative optimal set of active indices is available. (If such a tentative is not available, we can simply set I to be the set of all training indices.) Then we choose $\gamma$ and $b_0$ to minimize the cost:

$$\lambda/2(\gamma^2 \|\tilde{w}\|^2 + b_0^2) + 1/2 \sum_{i \in I} \rho_i (\gamma \tilde{w} \cdot x_i + b_0 - t_i)^2 \quad \text{(equation 6)}$$

The resulting $\gamma$ and $b_0$ are given by $\gamma = (p_{22} q_1 - p_{12} q_2)/d$ and $b_0 = (p_{11} q_2 - p_{12} q_1)/d$, where $$p_{11} = \lambda \|\tilde{w}\|^2 + \sum_{i \in I} \rho_i (\tilde{w} \cdot x_i)^2$$

$$p_{22} = \lambda + \sum_{i \in I} \rho_i$$

$$p_{12} = \sum_{i \in I} \rho_i (\tilde{w} \cdot x_i)$$

$$q_1 = \sum_{i \in I} \rho_i t_i (\tilde{w} \cdot x_i)$$

$$q_2 = \sum_{i \in I} \rho_i t_i$$

and $d = p_{11} p_{22} - (p_{12})^2$

Once $\gamma$ and $b_0$ are thus obtained, set $\beta_0 = (\gamma \tilde{w}, b_0)$ and start the iterative process 504. Note that the set of initial indices $I_0$ chosen later when solving for $$\min_{\beta} f_{I_k}(\beta)$$

is the set of active indices at $\beta_0$ and so could be different from I.

There is one particular situation where the above initialization comes in very handy: if we solve equation 2 for one C and want to re-solve equation 2 for a slightly changed C, then we use the $\tilde{w}$ and I that are obtained from the optimal solution of the first value of C to do the above mentioned initialization process for the second value of C. For this situation we can decide to choose $\gamma=1$ and $b_0$ equal to the b that is optimal for the first value of C. This simple initialization works quite well also. We refer to the initialization process step 502 discussed above for the 'slightly changed C' situation as β-seeding.

Now check in step 512 whether $\beta_k$ is the optimal solution of the above.

Define $I_k=I(\beta_k)$ Checking in step 512 for the optimality of $\beta_k$ is done by first calculating $y_i(\beta_k)$ and $d_i(\beta_k)$ for all i, then determining $I_k$ and then checking whether $$\|\nabla f_{I_k}(\beta_k)\|=0 \qquad \text{(equation 7)}$$

If so, stop in step 524 with $\beta_k$ as the solution. Else go to the following.

For practical reasons it is highly desirable to employ a tolerance parameter when checking the equation above. The issue is dealt with below in the discussion of the implementation of this part of the process.

Now let $I_k=I(\beta_k)$. Then solve:

$$\min_{\beta} f_{I_k}(\beta) \qquad \text{(equation 8)}$$

Let $\bar{\beta}$ denote the intermediate solution obtained by solving equation 8.

The solution of equation 8 for $\bar{\beta}$ can be approached in one of the following ways: using factorization methods, or using an iterative method such as the conjugate-gradient method in step 514. The conjugate gradient methods used in this embodiment are best because: (a) these conjugate gradient methods can make effective use of knowledge of good starting vectors; and (b) these conjugate gradient methods are much better suited for large scale problems having sparse data sets.

To set up the details of the conjugate gradient method step 514 used in this embodiment, let: D be a diagonal matrix whose diagonal elements are $\sqrt{\rho_i}$, and $i \in I_k$; X be the matrix whose rows are $(x_i^T, 1)$ and $i \in I_k$; t be a vector whose elements are $t_i$, $i \in I_k$; A=DX and $f$=Dt.

Then the solution of equation 8 is the same as the regularized (or damped) least squares problem:

$$\min_{\beta} f_{I_k}(\beta) = \lambda/2\|\beta\|^2 + 1/2\|A\beta - f\|^2 \qquad \text{(equation 9)}$$

This corresponds to the solution of the normal system, $$(\lambda I + A^T A)\beta = A^T f \qquad \text{(equation 10)}$$

where $A^T$ denotes the transpose of the matrix A.

Since we are working with problems that have large and sparse data sets, we use conjugate gradient methods and avoid the formation of $A^T A$.

With conjugate gradient methods there are several ways of approaching the solution of the problem mentioned in equations 9 and 10. A simple approach is to solve equation 9 using the conjugate gradient method meant for solving positive definite systems. However, such an approach will be numerically ill-conditioned, especially when λ is small. In this embodiment, we use the numerically stable implementation of the Conjugate Gradient Least Squares (CGLS) iterative process (see for example algorithm 3 of "Fast CG-Based Methods for Tikhonov-Phillips Regularization", SIAM Journal on Scientific Computing, Volume 20, Number 5, pages 1831-1850 (1999), by Andreas Frommer and Peter Maaβ). It is understood that other conjugate gradient methods are also useful with our use of $L_2$-SVM-IRLS in embodiments of the invention.

To solve the problem mentioned in equations 9 and 10, the (Conjugate Gradient Least Squares) CGLS process 514 is to set $\beta^0 = \beta_k$ (the $\beta_k$ of steps 522 and 514), compute $z^0 = f - A\beta^0$, $r^0 = A^T z^0 - \lambda \beta^0$, $p^0 = r^0$ and complete the following steps for j=0, 1

$$q^j = Ap^j$$

$$\gamma^j = \|r^j\|^2/(\|q^j\|^2 + \lambda\|p^j\|^2)$$

$$\beta^{j+1} = \beta^j + \gamma^j p^j$$

$$z^{j+1} = z^j - \gamma^j q^j$$

$$r^{j+1} = A^T z^{j+1} - \lambda \beta^{j+1}$$

If $r^{j+1} \cong 0$ stop the CGLS iterative process with $\beta^{j+1}$ as the value for the intermediate solution $\bar{\beta}$, else compute:

$$\omega^j = \|r^{j+1}\|^2/\|r^j\|^2$$

$$p^{j+1} = r^{j+1} + \omega^j p^j$$

There are two matrix-vector operations in each iteration, and sparsity of the data matrix can be used effectively to do these operations in O(nz) time where nz is the number of non-zero elements in the data matrix. The process will take at most l iterations where l is the rank of A, and $1 \leq \min\{m, n\}$, where m is the number of examples and n is the number of features. The actual number of iterations required to achieve good practical convergence is usually much smaller than $\min\{m, n\}$ and depends on the number of singular values of A that are really significant. It is, therefore, important to talk about practical stopping criteria for the CGLS iterations. This corresponds to the check $r^{j+1} \cong 0$ in the CGLS iterative process. We can decide to stop when the vector $r^{j+1}$ has come near zero up to some precision. We have $\|r^{j+1}\| \leq \|A\| \|z^{j+1}\| + \|\lambda \beta^{j+1}\|$.

Lets assume that the data is normalized along each feature, i.e., each feature is normalized to the (0, 1) range. Then $\|A\| \leq \sqrt{n\Sigma\rho_i}$. Thus, we can terminate CGLS when the following condition is achieved:

$$\|r^{j+1}\| \leq \epsilon(\sqrt{n\Sigma\rho_i}\|z^{j+1}\| + \|\lambda\beta^{j+1}\|) \qquad \text{(equation 11)}$$

where ε is a suitably chosen small positive relative tolerance parameter. In the actual implementation we have simplified it. Since $A^T z^{j+1}$ and $\lambda\beta^{j+1}$ are nearly equal when we approach the solution, leave out the $\|\lambda\beta^{j+1}\|$ term; also, taking a conservative approach, also leave out the $\sqrt{n\Sigma\rho_i}$ term. Thus, use the stopping criterion, $$\|r^{j+1}\| \leq \epsilon\|z^{j+1}\| \qquad \text{(equation 12)}$$

The values $\epsilon=10^{-3}$, can be expected to be sufficient for yielding good solutions. Since $r=-\nabla f_{l_k}$, apply the same criteria as in equation 12 for approximately checking equation 7 also. The stopping criteria developed above are crucial. Use of a casually chosen absolute tolerance parameter for $\|r^{j+1}\|$ can result either in poor classifiers or an unacceptably large increase in the amount of computing time.

Now do a line search (exactly) in step 516 to decrease the full objective function, $f$:

$$\min_{\beta \in L} f(\beta)$$

where $L=\{\beta=\beta_k+\delta(\bar{\beta}-\beta_k): \delta \geq 0\}$. Let $\delta^*$ denote the solution of this line search in step 518.

Set $\beta_{k+1}=\beta_k+\delta^*(\bar{\beta}-\beta_k)$, $k:=k+1$ and go back to step 504 for another possible iteration.

This process of finding $\delta^*$ is developed as follows.

Let $\beta(\delta)=\beta_k+\delta(\bar{\beta}-\beta_k)$. The one dimensional function, $\phi(\delta)=f(\beta(\delta))$ is a continuously differentiable, strictly convex, piecewise quadratic function. What is needed is the minimizer of this function. To determine this minimizer analytically, compute the points at which the second derivative jumps. For any given i, define:

$\delta_i=(t_i-y_i^k)/(\bar{y}_i-y_i^k)$, where $\bar{y}_i$ is $y_i(\bar{\beta})$ and $y_i^k=y_i(\beta_k)$. The jump points mentioned above are given by $$\Delta=\Delta_1 \cup \Delta_2 \qquad \text{(equation 13)}$$

where $\Delta_1=\{\delta_i: i \in I_k, t_i(\bar{y}_i-y_i^k)>0\}$ and $$\Delta_2=\{\delta_i: i \notin I_k, t_i(\bar{y}_i-y_i^k)<0\} \qquad \text{(equation 14)}$$

For $\Delta_1$ i is not used with $t_i(\bar{y}_i-y_i^k) \leq 0$ because the terms in $t_i(\bar{y}_i-y_i^k)$ do not cause switching at a positive $\delta$; similarly, for $\Delta_2$ i is not used with $t_i(\bar{y}_i-y_i^k) \geq 0$.

Take one $\delta_i \in \Delta_1$. When $\delta$ is increased across $\delta_i$, the index i leaves $I(\beta(\delta))$. Thus, the term $\rho_i d_i^2/2$ has to be left out of the objective function for all $\delta > \delta_i$.

Similarly, take one $\delta_i \in \Delta_2$. When $\delta$ is increased across $\delta_i$, the index I enters $I(\beta(\delta))$. Thus, the term $\rho_i d_i^2/2$ has to included in the objective function for all $\delta > \delta_i$.

The slope, $\phi'(\delta)$ is a continuous piecewise linear function that changes its slope only at one of the $\delta_i$'s. The optimal point $\delta^*$ is the point at which $\phi'(\delta)$ crosses 0. To determine this point we first sort all $\delta_i$'s in $\Delta$ in non-decreasing order. To simplify the notations, let us assume that $\delta_i$, i=1, 2 ... denote that ordering. Between $\delta_i$ and $\delta_{i+1}$ we know that $\phi'(\delta)$ is a linear function. Just for doing calculations, extend this line both sides (left and right) to meet the $\delta=0$ and $\delta=1$ vertical lines. Call the ordinate values at these two meeting points $l_i$ and $r_i$ respectively. It is very easy to keep track of the changes in $l_i$ and $r_i$ as indices get dropped and added to the active set of indices.

Then move from left to right to find the zero crossing of $\phi'(\delta)$. Initially, $\delta_{0=0}$. Between $\delta_0$ and $\delta_1$ we have $I_k$ as the active set.

We can get, from the definition of $\phi(\delta)$. that $$l_0 = \lambda \bar{\beta}_k \cdot (\bar{\beta}-\beta_k) + \sum_{i \in I_k} \rho_i(y_i^k-t_i)(\bar{y}_i-y_i^k) \qquad \text{(equation 15A)}$$

and $$r_0 = \lambda \bar{\beta} \cdot (\bar{\beta}-\beta_k) + \sum_{i \in I_k} \rho_i(\bar{y}_i^k-t_i)(\bar{y}_i-y_i^k) \qquad \text{(equation 15B)}$$

Find the point where the line joining $(0, l_0)$ and $(1, r_0)$ points on the $(\delta, \phi')$ plane crosses zero. If the zero crossing point of this line is between 0 and $\delta_1$ then that point is $\delta^*$. If not, move over to searching between $\delta_1$ and $\delta_2$. Here $l_1$ and $r_1$ need to be computed. This can be done by updating over $l_0$ and $r_0$ since only the term $\rho_i d_i^2/2$ enters or leaves. Thus, for a general situation where $l_i$, $r_i$ are computed for the interval $\delta_i$ and $\delta_{i+1}$ and we need to get $l_{i+1}, r_{i+1}$ for the interval $\delta_{i+1}$ to $\delta_{i+2}$, use the update formula:

$$l_{i+1}=l_i+s\rho_i(y_i^k-t_i)(\bar{y}_i-y_i^k) \text{ and } r_{i+1}=r_i+s\rho_i(\bar{y}_i^k-t_i)(\bar{y}_i-y_i^k) \qquad \text{(equation 16)}$$

where $s=-1$ if $\delta_i \in \Delta_1$, and $s=1$ if $\delta_i \in \Delta_2$.

Thus keep moving to the right until we get a zero satisfying the condition that the root determined by interpolating $(0, l_i)$ and $(1, r_i)$ lies between $\delta_i$ and $\delta_{i+1}$. The process is bound to converge since we know the existence of the minimizer, because we are dealing with a strictly convex function.

In addition, the speed of the overall process described above will be significantly increased if the following two procedures are employed whenever the initial $\beta$ is a crude approximation of the final solution: 1) Terminate the first call to the CGLS process after just ten iterations; 2) First run the full iterative process with the crude tolerance, $\epsilon=10^{-3}$, then use the $\beta$ thus obtained as the seed and do another run of the iterative process with the tight tolerance, $\epsilon=10^{-6}$.

Scope of the Invention

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. Although sub-section titles have been provided to aid in the description of the invention, these titles are merely illustrative and are not intended to limit the scope of the present invention. In addition, while the above description of this invention has been in the context of web-based page classification, one skilled in the art would be able to implement the present invention in other classification applications.

It is therefore intended that the following appended claims be interpreted as including all such alterations, modifications, permutations, and substitute equivalents as fall within the true spirit and scope of the present invention.

What is claimed is:

1. A computer-readable storage medium storing a set of instructions for building a support vector classifier useful for classifying a plurality of documents, including textual documents, the set of instructions being executed by a processor, the set of instructions performing the steps of:

selecting a plurality of training documents, each training document having suitable numeric attributes which are associated with a training document vector;

initializing a classifier weight (w) and a classifier intercept (b) for a classifier boundary, the classifier boundary separating at least two document classes;

determining which training document vectors are suitable support vectors;

re-computing the classifier weight vector and the classifier intercept for the classifier boundary using the suitable support vectors together with an iteratively reindexed least squares method and a conjugate gradient method with a stopping criterion; and storing the recomputed classifier weight vector and the classifier intercept for the classifier boundary at a data store in communication with the processor.

2. The computer-readable storage medium of claim 1 wherein the textual documents include sparse data matrices.

3. The computer-readable storage medium of claim 2 wherein the textual documents are from the World Wide Web.

4. The computer-readable storage medium of claim 1 wherein $\beta$ is assigned an initial value of 0, $\beta = (w,b)$, and wherein $\beta$ is used to build the support vector classifier.

5. The computer-readable storage medium of claim 1 wherein a first known value for $\beta$ associated with a first regularization value is used to calculate a second value of $\beta$ for a second regularization value.

6. The computer-readable storage medium of claim 1 wherein the iteratively re-indexed least squares method includes an exact line search.

7. The computer-readable storage medium of claim 1, wherein the conjugate gradient method includes:

setting $\beta^0 = \beta_k$;

computing $z^0 = f - A\beta^0$, $r^0 = A^T z^0 - \lambda\beta^0$, $p^0 = r^0$; and for j=0, 1 . . . computing:

$q^j = Ap^j$ $\gamma^j = \|r^j\|^2 / (\|q^j\|2 + \lambda\|p^j\|^2)$ $\beta^{j+1} = \beta j + \gamma^j p^j$ $z^{j+1} = z^j + \gamma^j p^j$ $r^{j+1} = A^T z^{j+1} - \lambda\beta^{j+1}$; and if $r^{j+1} \approx 0$ stop the conjugate gradient method, else computing:

$\omega^j = \|r^{j+1}\|^2 / \|r^j\|^2$; and $p^{j+1} = r^{j+1} + \omega^j p^j$.

8. The computer-readable storage medium of claim 1 wherein the stopping criterion for the conjugate gradient method is $r^{j+1} \approx 0$.

9. The computer-readable storage medium of claim 7 wherein $r^{j+1} \approx 0$ is implemented using the condition $\|r^{j+1}\| \leq \epsilon \|\|z^{j+1}\|$ for $\epsilon = 10^{-3}$.

10. The computer-readable storage medium of claim 1 wherein for a first value of $\beta$, iterations of the conjugate gradient method are substantially reduced, wherein the iteratively reindexed least squares method and the conjugate gradient method are completed using $\epsilon = 10^{-3}$ to obtain a second value of $\beta$, and wherein the iteratively reindexed least squares method and the conjugate gradient method are repeated using $\epsilon = 10^{-6}$.

11. The computer-readable storage medium of claim 1 wherein $\beta_0 = (\gamma\omega, b_0)$, wherein $\gamma = (p_{22}q_1 - p_{12}q_2)/d$, and $b_0 = (p_{11}q_2 - p_{12}q_1)/d$, and wherein $$p_{11} = \lambda\|\tilde{\omega}\|^2 + \sum_{i \in I} \rho_i; \quad p_{12} = \sum_{i \in I} \rho_i(\omega \cdot x_i);$$

$$q_1 = \sum_{i \in I} \rho_i t_i (\tilde{\omega} \cdot x_i); \quad q_2 = \sum_{i \in I} \rho_i t_i; \text{ and } d = p_{11}p_{22} - (p_{12})^2.$$

* * * * *